Nov. 18, 1958      H. N. STEPHAN      2,860,547
HORIZONTAL BORING, DRILLING AND MILLING MACHINE
Filed July 14, 1955      3 Sheets-Sheet 1
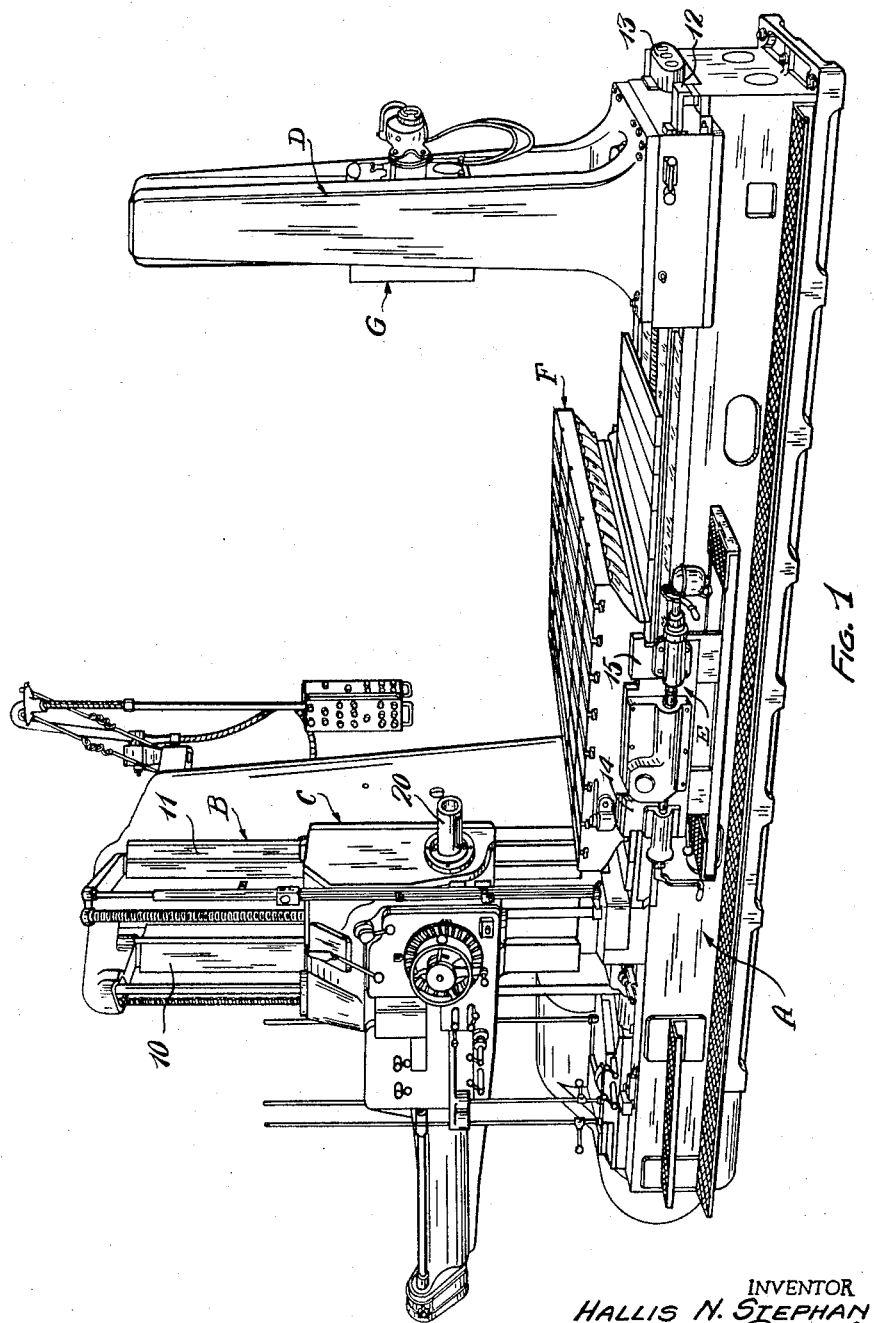

Nov. 18, 1958     H. N. STEPHAN     2,860,547
HORIZONTAL BORING, DRILLING AND MILLING MACHINE
Filed July 14, 1955     3 Sheets-Sheet 2
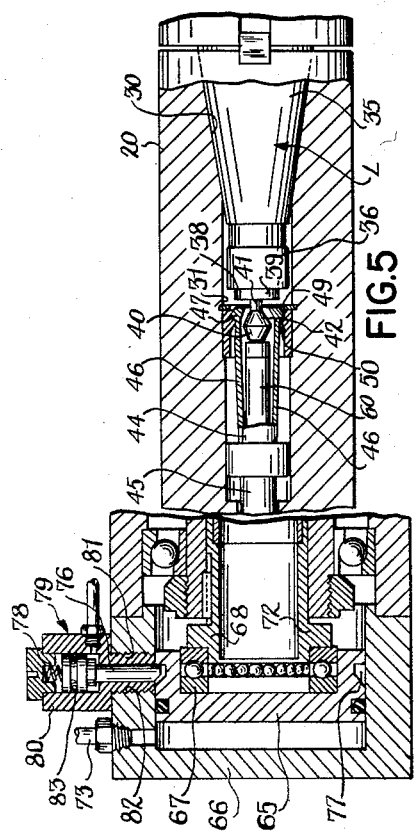
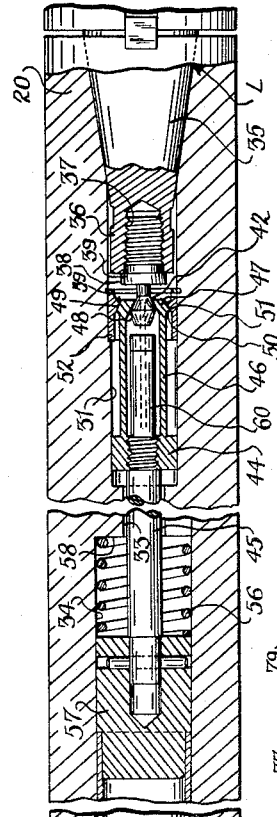
INVENTOR.
HALLIS N. STEPHAN
BY Hudson, Boughton,
Williams, David & Hoffmann
ATTORNEYS

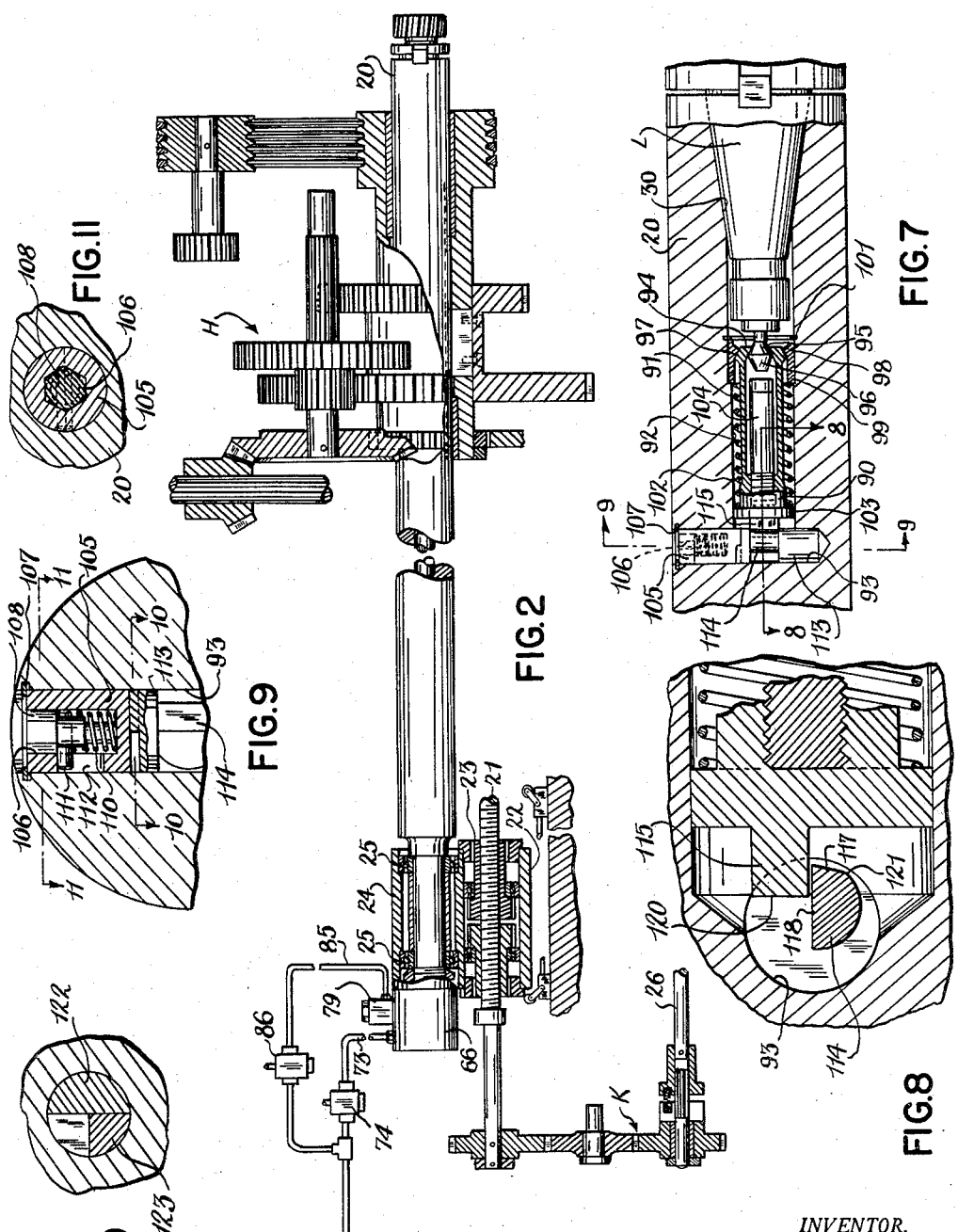

United States Patent Office 2,860,547
Patented Nov. 18, 1958

2,860,547

HORIZONTAL BORING, DRILLING, AND MILLING MACHINE

Hallis Noah Stephan, Cleveland Heights, Ohio, assignor to The New Britain Machine Company, New Britain, Conn., a corporation of Connecticut Application July 14, 1955, Serial No. 522,066

13 Claims. (Cl. 90—11)

The present invention relates to machine tools, especially, combined horizontal boring, drilling and milling machines, and, more particularly, to the tool spindle mechanism thereof.

The principal object of the present invention is the provision of a new and improved machine tool, particularly a combined horizontal boring, drilling and milling machine, having a tool spindle with an aperture opening into the forward end thereof, and forming a socket for receiving a tool arbor, and binding means in the spindle aperture for releasably securing the tool arbor in the socket comprising a movable binding member positionable between a fixed, inclined abutment surface carried by the spindle and a surface on the arbor to wedge the tool arbor in the spindle socket, the binding means being so constructed and arranged that a force tending to pull the arbor from the spindle socket increases the wedging action of the binding member.

Another object of the present invention is the provision of a new and improved machine tool, particularly a combined horizontal boring, drilling and milling machine having a tool spindle with an aperture therein opening into the forward end of the spindle and forming a tapered socket for receiving a tool arbor, and a collet mechanism within the spindle for releasably binding or locking the arbor in the spindle socket comprising collet fingers adapted to be wedged between surfaces on the spindle and arbor, respectively, which are inclined in the same direction with respect to the spindle axis, the collet mechanism preferably being spring biased to its locking or binding position and including in the preferred embodiment, an abutment member for ejecting the tool arbor from its seat in the spindle socket upon actuation of the collet mechanism, preferably by power actuated means, from a locking or binding position to an arbor releasing- and ejecting position, and being so constructed and arranged that upon release of the force for moving the collet mechanism to its arbor releasing-and-ejecting position, the collet mechanism is maintained in an arbor receiving position, preferably by a power actuated latch means, with the abutment member retracted to a position where it permits seating of the arbor in the spindle socket to assure proper engagement of the collet mechanism with the inclined surfaces on the tool arbor upon subsequent actuation of the collet mechanism to its locking or binding position.

Another object of the present invention is the provision of a new and improved spindle mechanism for a machine tool, the spindle having an axially extending aperture opening into the forward end of the spindle and defining a tapered socket at the forward portion thereof for receiving a tool arbor, and binding or locking means comprising a collet, preferably power actuated to one of its positions for releasably securing a tool arbor in the spindle socket, the collet having resilient fingers with first or inner surfaces tapered or inclined with respect to the spindle axis and adapted to engage an inclined surface on the tool arbor and tapered or inclined second or outer surfaces, inclined in the same direction as the inner surfaces with respect to the spindle axis but at a lesser angle, the outer surfaces being adapted to cooperate with a fixed surface carried by the spindle to wedge the arbor in the spindle socket and to prevent the spreading of the spring fingers to release the arbor when the arbor is subjected to forces tending to pull it from the spindle socket.

The invention resides in certain constructions and combinations and arrangements of parts, and further objects and advantages of the invention will be apparent to those skilled in the art to which it relates from the following description of the preferred embodiment described with reference to the accompanying drawings forming a part of this specification, and in which:

Fig. 1 is a perspective view of a combined horizontal boring, drilling and milling machine embodying the present invention;

Fig. 2 is a fragmentary view of the machine shown in Fig. 1, partly in section and partly schematic, showing the tool spindle and certain parts of the driving mechanism therefor;

Fig. 3 is a sectional view of the tool spindle showing a conventional milling machine cutter attached therein;

Figs. 4 and 5 are sectional views similar to Fig. 3 but showing the collet and actuating mechanism therefor in different positions;

Fig. 6 is an enlarged fragmentary view showing collet in binding position;

Fig. 7 is a sectional view through a spindle of a machine tool embodying an alternative form of the present invention.

Fig. 8 is a sectional view approximately along line 8—8 of Fig. 7.

Fig. 9 is a fragmentary sectional view approximately along line 9—9 of Fig. 7.

Fig. 10 is a fragmentary sectional view approximately along line 10—10 of Fig. 9, and Fig. 11 is a fragmentary sectional view approximately along line 11—11 of Fig. 9.

Referring to the drawings, the combined horizontal boring, drilling and milling machine, shown therein, is generally similar to that disclosed in the U. S. Patent to Lucas et al. 2,350,174 and comprises a base A, provided at one end with a spindle head column B formed with vertical ways 10 and 11 upon which a spindle head C is mounted for vertical movement, and at the other end with a backrest or an outboard support column D slidably supported on horizontal ways 12 and 13 on the upper side of the bed. The ways 12 and 13 also support a saddle E having transversely extending horizontal ways 14 and 15 on the upper side thereof which, in turn, supports a worktable F. The backrest column D has vertical ways upon which a backrest block G is mounted for vertical movement. The spindle head, outboard support column D, saddle E, table F and backrest block G may be moved in any conventional manner; the details of which are not necessary for the understanding of the present invention and are not shown.

The spindle head C supports a tool spindle 20, which spindle is adapted to be rotated by suitable driving mechanism indicated generally at H and which is more fully explained in the aforesaid patent. The spindle 20 is also adapted to be fed or rapidly traversed axially in either direction by a lead screw 21 rotatably supported in a part 22 of the spindle head and having threaded engagement with a two-piece anti-backlash nut 23, located within the feed slide 24 carried by the spindle head C and connected to the spindle 20 adjacent to the left-hand end or rear of the spindle by bearings 25. The lead screw 21 is adapted to be rotated manually or by power in either direction and at different speeds through a suitable power transmission including the shaft 26 and the gears K. Since the construction of such mechanisms is conventional and not essential to the understanding of the present invention, they are not shown.

In accordance with the present invention, the spindle 20 is provided with an axially extending aperture, the forward portion of which aperture preferably forms a tapered socket 30 fashioned by choice to receive the arbors of conventional milling machine tools, for example, the arbor L. The socket 30 terminates in a cylindrical bore 31 the diameter of which, in the preferred embodiment, is about one-third that of the spindle, and the bore 31, in turn, communicates with an axial bore 33 extending to the rear end of the spindle. The portion of the bore 33 adjacent to the rear end of the spindle is counterbored as at 34, the purpose of which will be apparent as the description proceeds. The socket 30 and bore 31 are adapted to receive the conventional milling machine tool arbor L or other tool arbor, the taper of the shank 35 of which corresponds to the taper of the socket 30, and the rear cylindrical portion or pilot 36 of which fits into the bore 31 and is provided with the conventional tapped or threaded hole 37.

The arbor in the present instance, is provided with an adapter or lock plug 38 threaded into the hole 37, prior to its assembly with the spindle, until a flange 39 formed thereon abuts against the rearward end of the arbor L. Alternatively, the so-called adapter 38 could be formed integrally with the arbor L, to this extent the arbor, however, would not then be a conventional milling machine arbor. To the left of the flange 39, as viewed in the drawings, the adapter 38 is provided with a head 40 connected to the flange portion 39 by a reduced portion or neck 41. The portion of the head 40 adjacent to the neck 41 is frusto-conical in configuration and provides a conical surface 42 diverging rearwardly with respect to the axis of the spindle, which surface is adapted to be engaged by mechanism for binding or locking the arbor L in the spindle socket.

The mechanism shown for locking or binding the arbor L in the socket 30 comprises a collet 44 positioned within the bore 31 and threaded onto the forward end of a drawbar 45 extending from the bore 31 through the bore 33 and into the counterbore 34. Reciprocation of the drawbar 45 will move the collet 44 axially in the bore 31.

The collet 44 includes a plurality of spring or resilient fingers 46 each having an outer end or wedge portion 47 provided with an inner inclined surface 48 and an outer inclined surface 49. The inner surface 48 of each wedge portion 47 is inclined with respect to the spindle axis so as to diverge rearwardly from the axis of the spindle and is adapted to engage the rearwardly diverging surface 42 on the adapter 38 when the collet 44 is in its binding or locking position. The outer inclined surface 49 of each finger also diverges rearwardly and engages an annular rearwardly diverging abutment surface 50 on a flange 51 extending inwardly from the inner wall of a bushing 52 fixed within the bore 31 of the spindle.

The abutment surface 50 diverges rearwardly with respect to the axis of the spindle with its acuate angle of inclination preferably being less than the acute angle of inclination of the surface 42 of the adapter. The inner surfaces 48 and outer surfaces 49 of the wedge portions 47 have, in the illustrated embodiment, the same angle of inclination as the surfaces 42, 50, respectively. In the binding position of the collet the portion 47 of each of the fingers 46 acts as a wedge, preferably a locking wedge, operating between the fixed abutment surface 50 carried by the spindle and the inclined surface 42 of the adapter 38.

The collet 44, in the illustrated embodiment, is continuously urged to a retracted or wedging position, shown in Fig. 3, wherein it is adapted to lock the arbor L in the spindle socket by a spring 56 positioned in the bore 34 at the rear end of the spindle. The spring 56 is interposed between a cylindrical member 57 fixed to the end of the drawbar 45 and a shoulder 58 formed by the bottom of the counterbore 34.

To release the arbor L from the spindle socket 30, the collet 44 is moved forwardly in the bore 31 to move the wedge portions 47 of the fingers 46 from between the fixed inclined surface 50 of the spindle and the inclined surface 42 of the adapter 38 and to position the wedge portions 47 in the bore 31 forwardly of the shoulder 59 forming the forward or right-hand side of the internal flange 51 upon which the inclined surface 50 is formed. With the wedge portions 47 of the fingers 40 forward of the shoulder 59, the fingers 46 will expand when the arbor is moved outwardly and permit the withdrawal of the arbor L from the spindle socket. As the collet 44 is moved forwardly by the drawbar 45 the forward portion 60 of the drawbar 45 functions as an ejector or abutment member and strikes the rear or left-hand end of the adapter 38 to unseat the arbor L from the socket 30, as shown in Fig. 4. The movement of the ejector 60, after it engages the end of the adapter 38, need only be sufficient to break the arbor away from its seat in the socket 30. Preferably the inherent resiliency of the fingers 46 urge them into engagement with adapter 38 so that the arbor will be held by the fingers 46 after it is unseated from the socket 30. To completely remove the arbor from the spindle socket the operator need merely pull it outwardly to cause the fingers 46 to expand and release the arbor.

In the illustrated embodiment, the collet 44 is moved forwardly with respect to the spindle 20 from its rearward locking or binding position in bore 31 to its forward releasing-and-ejecting position by a hydraulic reciprocating type motor having a piston 65 slidable in a cylinder 66 fixed to the spindle slide 24 adjacent to the rearward end of the spindle, the piston and the cylinder being coaxial with the spindle. The piston 65 is operatively connected to the cylindrical member 57 fixed to the rearward end of drawbar 45 by a thrust bearing 67 supported on the rearward end of a sleeve 68 slidably keyed in the counterbore 34 adjacent to the rearward end thereof and fixedly connected to the cylindrical member 57 by a tube 70 in the counterbore 34. The thrust bearing 67 is supported within the skirt 71 of piston 65 and bears against a shoulder formed by an external flange 72 on the end of the sleeve 68 projecting from the counterbore 34 of the spindle 20. The thrust bearing 67 permits the sleeve 68 to rotate with the spindle without rotating the piston 65 but transmits the axial movement of the piston to the sleeve 68, drawbar 45, etc. Conversely, the thrust bearing 67 transmits the axial movement of the drawbar and sleeve to the piston.

Fluid pressure for moving the piston 65 in a forward direction is supplied to the cylinder 66 through a fluid pressure supply line 73 including a solenoid valve 74 for controlling the flow of fluid pressure to and from the cylinder 66. When the valve is deenergized, the supply of pressure fluid to cylinder 66 is disconnected and the cylinder is connected to drain. Upon energization of the solenoid valve, it is moved to a position which closes the drain and permits the flow of pressure fluid to the cylinder 66. The fluid pressure applied to the piston 65 must be sufficient to overcome the action of spring 56 which continually urges the collet 44 and the drawbar 45 in a rearward direction.

When the spindle 20 does not have an arbor secured thereto, it is desirable to maintain the locking or binding mechanism or more particularly the wedging portion 47 of the collet fingers 46, in a forward position ready to receive an arbor inserted into the socket 30, as shown in Fig. 5. In the illustrated and preferred embodiment of the present invention, the collet 44 is held in an arbor receiving position against the action of the spring 56 upon the release of the fluid pressure in cylinder 66 by a radially extending detent pin 76 carried by the cylinder 66, the inner end of which pin is adapted to engage in an annular groove 77 in the skirt 71 of the piston 65 when the piston is adjacent to the forward end of its stroke. The detent pin 76 is biased by a spring 78 toward its engaged position and power actuated to its released position by a fluid pressure motor designated generally by the reference numeral 79. The detent pin 76 is slidably supported in the cylinder member 80 of the fluid pressure motor 79 which cylinder member includes a threaded boss 81 extending inwardly through an opening 82 in the cylinder 66. When the collet 44 is in its rearward position, that is in the position in which it locks or binds an arbor in the spindle socket, the piston 65 will be in its rearward position and the detent pin 76 will merely engage the side of the piston skirt 71 forwardly of the annular groove 77 in the skirt 71 of the piston. Upon forward movement of the piston 65, the detent pin drops into the annular groove 77 due to the bias of the spring 78. The rearward sides of the annular groove 77 and the detent pin are sloped so that the engagement of detent pin 76 in the groove 77 will not stop the forward movement of the piston, the extent of the forward movement being determined by the engagement of the flange 72 of sleeve 68 with the rearward end of the spindle 20. The forward side of the groove 77, however, extends radially, and when the fluid pressure in the cylinder 66 is released, will engage the detent pin 76 upon rearward movement of the piston a predetermined distance from its forward position as will appear hereinafter.

The radially outer end of detent pin 76 is connected to a piston 83 slidable in a suitable bore in the cylinder member 80. The outer end of the cylinder member 80 is closed by a plug 84, and the spring 78 for urging the detent pin 76 towards the piston skirt 71 is interposed between the plug 84 and the piston 83. Fluid pressure is supplied to the cylinder member 80 to move the detent pin 76 in a direction away from the piston 65, that is in a direction to release the latching action of the detent pin 76, by a conduit 85 connected thereto and to a solenoid valve 86 which controls the application of the fluid pressure to the motor 79 and its exhaust therefrom. The valve 86 is normally in a position to connect the motor 79 to exhaust. When energized, the valve is actuated to a position to permit the flow of pressure fluid to motor 79, and upon application of fluid pressure to the motor 79, the piston 83 moves against the action of spring 78 and the detent pin 76 withdrawn from the annular groove 77 permitting the spring 56 to move the collet 44 to its rearward locking or binding position.

It has been found that the seating of the arbor L and the proper binding action of the wedge portions 47 are facilitated if the collet 44 and the arbor ejecting portion 60 of the drawbar 45 is retracted sufficiently to permit the full seating of the arbor L in the arbor socket prior to wedging the portions 47 between the adapter 38 and the fixed surface 50 within the spindle. The latching mechanism, comprising the detent pin 76 and the groove 77 in the cylinder is so constructed and arranged that when the collet 44 is being held in a forward position by the detent pin 76 the ejector 60 is retracted just far enough to allow arbor L to be firmly seated in the socket 30, as shown in Fig. 5, but not far enough for the collet fingers 46 to be moved inwardly a sufficient distance for flange 51 to prevent the insertion of the inner end of the adapter 38 into the collet. After the arbor L has been inserted and seated in the socket, the power actuated detent 76 may be released and the spring 56 allowed to move the collet 44 to engage the wedge portions 47 of the fingers 46 between the inclined surfaces on the spindle and adapter. The forward side of flange 51 and the abutment at the rearward end of the inclined surfaces 49 of the wedge portions 47 of fingers 46 are shaped so as not to prevent the rearward movement of the collet 44 to its arbor locking or binding position. When the detent pin 76 is withdrawn from the groove 77 in the skirt 71 of the piston, the spring 56 draws the collet 44 and the wedge portions 47 of the fingers 46 thereof into binding position with a hammer-like action which securely forces the arbor into the socket and effects a secure binding thereof.

In the illustrated embodiment, the inner inclined surface 48 and the outer inclined surface 49 of the wedge portions 47 have been shown and described as having rearward diverging inclinations of different magnitudes with respect to the axis of the spindle 20. As hereinbefore mentioned, the fixed abutment surface 50 and the conical surface 42 on the adapter 38 will normally have the same inclination as the respective engaging surfaces of the fingers 46. Preferably, the inclination of the inner surface of the wedge portions 47 is approximately 30 degrees and the inclination of the outer surfaces of the wedge portions 47 approximately 20 degrees with respect to the spindle axis. With inclinations of this order of magnitude, no difficulty has been encountered in clamping and releasing the binding mechanism.

The operation of the preferred and illustrated mechanism for binding and securing the arbor L in the tool spindle 20 may be summarized as follows. When no arbor is positioned in the spindle socket 30, the collet mechanism for securing an arbor in the spindle is maintained in the position illustrated in Fig. 5 with wedge portions 47 of the collet 44 positioned just forwardly of the flange 51, the collet being held in this position by the detent pin 76 which is in engagement with the forward side of the annular groove 77. Subsequent to insertion of the arbor L into the socket 30 and the seating of the arbor against the side wall of the socket, valve 86 is actuated to supply fluid pressure to hydraulic motor 79 through supply line 84 causing the piston 83 to move in a direction to withdraw the detent pin 76 from the annular groove 77. When the detent pin 76 is withdrawn from the groove 77, the spring 56 moves the collet 44 and the piston 65 of the cylinder 66 in a rearward direction. Movement of the collet 44 in a rearward direction causes the fingers 46 to move inwardly toward the reduced or neck portion of the adapter 38 permitting the wedge portions 47 to move past the shoulder 59. Continued rearward movement of the collet 44 causes the wedge portions 47 to wedge themselves between the fixed inclined abutment surface 50 and the conical surface 42 on the adapter 38. The collet 44 is held in its rearward position, shown in Fig. 3, with the finger portions 47 wedged between the abutment surface 50 and the adapter 38 by the action of spring 56 and any force tending to move the arbor L axially in an outward direction and tending to unseat the arbor will merely increase the wedging action of the finger portions 47 and create a reactive force in the abutment surface 50 tending to move the arbor L in a seating direction. From the foregoing, it will be seen that it is practically impossible to force the arbor L from the socket 30 when a collet is constructed according to the present invention without releasing the collet.

To release the arbor L and remove it from the socket 30 the solenoid valve 74 is activated to supply fluid pressure to the hydraulic cylinder 66 through fluid supply line 73. The fluid pressure supplied to the cylinder 66 will move the piston 65 forwardly, which, in turn, moves the collet 44 forwardly to remove the wedge portions 47 of the fingers 46 from their binding and locking position intermediate the fixed abutment surface 50 and the surface 42 on the adapter 38. The releasing of the wedge portions 47 of the fingers 46 is facilitated by the difference in inclination of the surface 50 of the flange 51 and the surface 42 of the adapter. The surface 42 has a greater inclination with respect to the axis of the spindle and permits the wedge portions 47 to move downwardly away from the abutment surface 50 as the collet 44 is moved forwardly. Continued forward movement of the collet 44 allows the shoulders formed at the rearward ends of the outer inclined surfaces 49 to clear the annular shoulder 59, at which time the fingers 45 will move radially outwardly of the spindle as a result of their inherent resilient characteristics.

After the wedge portions 47 have cleared the shoulder 59 at the forward end of the abutment surface 50, the ejector 60 will strike the rearward end of the adapter 38 and additional forward movement of the collet 44 to the position of Fig. 4 will unseat the arbor L from the socket 30, thereby facilitating the removal of the arbor. After the arbor L has been removed, the solenoid valve 74 is deenergized, releasing the pressure applied to the piston 65 and permitting the spring 56 to move the collet rearwardly until the detent pin 76 engages the forward side of the annular groove 77 to prevent further rearward movement. Upon engagement of the detent pin 76, the collet mechanism is held in a position to again receive an arbor to be secured in the spindle socket, the mechanism being so positioned that the arbor may be completely seated in the socket 30 prior to the actuation of the detent pin 76 to permit movement of the collet 44 to its binding position, as above described.

While the preferred embodiment of the present invention utilizes power actuated means for moving the binding member or collet axially of the spindle between its arbor locking and arbor releasing position, it will be understood that other siutable means may be provided for this purpose. In the embodiment of the present invention, illustrated in Figs. 7 through 11, the arbor binding or locking mechanism is adapted to be moved between its positions by cam means rotated by the operator of the machine. As shown, a locking or binding collet 90 having a plurality of fingers 91, four in the illustrated embodiment, is provided for releasably securing a tool arbor L in the spindle socket 30 of the tool spindle 20. The tool spindle 20 and the tapered socket 30 may be of the same construction as the tool spindle 20, and the tapered socket 30 of the first embodiment. The tapered socket 30 terminates in an axial bore 92 similar to the axial bore 31, but the axial bore 92, in the embodiments of Figs. 8 and 9, terminates in a bore 93. The bore 93 extends transversely of the spindle 20 and opens at one end into the outer sidewall of the spindle.

The collet fingers 91 are of the same construction as the collet finger 46 of the first described embodiment and include wedge portions 94 having inner and outer inclined surfaces which cooperate, respectively, with an inclined frusto-conical surface 95 of an adapter 96 threaded into the arbor L and an inclined abutment surface 97 of a flange 98 extending inwardly from a sleeve 99 fixed coaxially within the bore 92 and prevented from axial movement therein by a shoulder 100 adjacent to its rearward end and by a snap ring 101 adjacent to its forward end. The adapter 96, the wedge portions 94 of the fingers 91, and the fixed inclined abutment surface 97 are of the same construction as the corresponding parts of the first described embodiment and will not, therefore, be described in detail. Suffice it to say that when the collet 90 is moved rearwardly in the bore 92, the wedge portions 94 are moved between the fixed abutment surface 97 and the frusto-conical surface 95 on the adapter 96 to securely wedge the arbor L in the tapered socket 30.

The collet 90 is continuously urged to a rearward or locking position by a spring 102 positioned about the collet 90 and interposed between the rearward end of sleeve 97 and a radially extending flange 103 formed on the rearward end of the collet 90. The radially extending flange 103 in addition to providing an abutment surface for the spring 102, functions to guide the movement of the collet 90 in the axial bore 92.

The collet 90 includes an ejector portion 104 similar to the ejector portion of the first described embodiment. The ejector portion 104 is adapted to engage the rearward end of the adapter 95 and unseat the arbor L upon movement of the collet 90 to its forwardmost position.

The operator of the machine may move the collet 90 forwardly in the bore 92 against the action of spring 102 by rotating a drive member 105 positioned in the bore 93 adjacent to the outer end thereof and having a hexagonal socket 106 for receiving a wrench for turning the member. The drive member 105 is held in position in the bore 93 by a snap ring 107 engaging its outer end and is provided with a plug 108 axially movable in the bore 106 for closing the bore to prevent entrance of dirt and the like. The plug 108 is spring-biased to a position where its outer side is substantially flush with the outer side of the drive member 105 by a spring 110 positioned intermediate the bottom of the plug 108 and the bottom of the bore 106. When a wrench is inserted into the bore socket 106, the plug 108 is depressed against the bias of spring 110 to allow the entrance of the wrench.

The plug 108 is provided with a pin 111 which extends radially therefrom and which operates in a slot 112 in the side of the drive member 105. The pin 111 guides the axial movement of the plug 108.

The drive member 105 is operatively connected to the collet 90 through a cylindrical member 113 positioned in the bore 93 intermediate the drive member 105 and a bottom of the bore 93, the cylindrical member 113 having a cam 114 thereon for engaging a cam follower portion 115 extending rearwardly from the collet 90. The cylindrical member 113 is rotated upon rotation of the drive member 105 through a lost motion connection between the members which will be described in detail hereinafter.

The cam 114 is formed in the illustrated embodiment by milling the cylindrical member 113 and is, as best shown in Fig. 8, substantially semicircular in cross-section with a flat 117 adjacent the trailing edge of the arcuate portion of the cam when the cam is rotated clockwise, as viewed in Fig. 8. The straight line or chordal portion 118 of the cam lies in a plane substantially through the axis of the cylindrical member 113 so that the center of rotation of the cam lies on the straight line or chordal portion 118. It will be noted, however, that the center of the semicircular portion of the cam is offset from the center of rotation in a direction toward the collet 90 when the cam is in the position shown in Fig. 8.

When the cam is in the position shown in Fig. 8, the cam follower portion 115, which has its center line offset from the center line of the collet 90, has one side thereof positioned adjacent to the straight line or portion 118 of the cam 114. In this position, the end 120 of the cam follower portion 115 is out of engagement with the cam 114 and the collet 90 is in its rearward position due to the action of spring 102. By rotating the cam 114 in a clockwise direction, as viewed in Fig. 8, the semicircular portion of the cam is brought into engagement with the end 120 of the cam follower portion 115 and continued rotation of the cam causes the collet 90 to move forwardly against the action of spring 102 until the high point 121 of the cam is in engagement with the cam follower portion. At this point, the collet 90 is in its forwardmost position in bore 92 which corresponds to the arbor-releasing and ejecting position of the first-described embodiment shown in Fig. 4. Continued rotation of the cam will cause the high point 121 to move out of engagement with the end of the cam follower portion 115 and engage the flat 117 with the cam follower portion. When the flat 117 is in engagement with the cam follower portion 115, the collet 90 is held in a retracted arbor-receiving position which corresponds to the position of the collet of the first-described embodiment shown in Fig. 5.

With the collet 90 in its arbor-receiving position in which the flat 117 is in engagement with the cam follower portion 115, the cam 114 is rotated clockwise as viewed in Fig. 8 to move the flat 117 out of engagement with the cam follower portion 115 and to actuate the collet to its binding or locking position. When the flat 117 leaves engagement with the end 120, the collet 90 is free to move rearwardly as the end 120 of the cam follower portion 115 loses engagement with the cam 114, and the collet will be moved to its binding position with a hammer-like action due to the force of spring 102.

It will be noted that when rotating the flat 117 of the cam 114 out of engagement with the cam follower portion 115, the spring 102 will apply a force through the cam follower portion 115 which tends to rotate the cam 114 in a clockwise direction, as viewed in Fig. 8. It is desirable that the cam 114 be free to move in response to the force applied thereto so that the operator cannot interfere with the rearward movement of the collet 90 by holding the drive member 105 against rotation with the wrench inserted into the socket 106. To enable the cam 114 to move with respect to the member 105, the drive connection between the member 105 and the cylindrical member 113 comprises, in the illustrated embodiment, a lost motion connection. The lost motion drive connection is obtained by cutting away part of the member 105 to form a semicylindrical projection 122 which extends inwardly from the drive member 105 and which engages a projection 123 extending outwardly from the cylindrical member 113 and has a cross-section which is substantially a 90 degree circular segment. The projections 123, 122 overlap each other and have the same center of curvature, which center lies on the axis of the bore 93. As is best shown in Fig. 10, when the drive member 105 rotated in a clockwise direction, as viewed in the figure, the straight line side of the projection 122 engages one of the straight line sides of the projection 123 to cause rotation of the member 113. It will be noted, however, that the member 113 can rotate 90 degrees in a clockwise direction with respect to the drive member 105, i. e., until the other straight line side of the projection 123 is in engagement with the straight line side of the projection 122, thus providing a lost motion connection between the drive member 105 and the cylindrical member 113. This lost motion connection will permit the cylindrical member 113 to move ahead of the drive member 105 when the cam is moved to permit the spring 102 to drive the collet to its binding position.

From the above description, it is apparent that the spindle construction and operation in the embodiment of Figs. 7 through 11 is similar to that of the first-described embodiment, with the exception of the means for actuating the collet or binding member to its various positions.

From the foregoing, it is also apparent that the objects heretofore enumerated and others have been accomplished and that a new and improved machine tool has been provided having a spindle mechanism including a locking or binding member for releasably securing an arbor in the spindle socket, the binding mechanism being so constructed and arranged that the binding member functions as a wedge which is moved intermediate a surface on the arbor and a fixed surface carried by the spindle to lock or bind the arbor, with the surfaces between which the member is moved being inclined in such a manner that forces tending to remove the arbor from the spindle socket merely tend to increase the wedging action of the member. According to other features of the present invention, power actuated means is provided for releasing the locking and binding mechanism, and a latching mechanism is provided to hold the locking and binding mechanism in an arbor receiving position upon the removal of an arbor from the spindle socket, which arbor receiving position permits the full seating of a tool arbor prior to actuation of the mechanism to its binding or locking position. While the locking or binding mechanism has been illustrated as power actuated to a released position and spring biased to an engaged position and the latching means for holding the mechanism in an arbor receiving position illustrated as power actuated to a disengaged position, it will be understood that the functions of the power actuated means and spring biasing means disclosed, may be performed by means actuated manually by the operator of the machine or by any other suitable mechanism.

While the preferred form of the invention has been described in considerable detail, it will be apparent that the invention is not limited to the construction shown and it is my intention to cover hereby all adaptations, modifications and changes therein which come within the practice of those skilled in the art to which the invention relates and the scope of the appended claims.

Having thus described my invention, I claim:

1. In a machine tool, a spindle having an axially extending aperture therein opening into the forward end thereof, the forward portion of the spindle aperture forming a rearwardly converging tapered socket for the reception of a tool arbor having a surface inclined with respect to the axis of the arbor in a direction opposite to that of said socket and which surface is adapted to be engaged to secure the arbor in the socket, a locking member in and movable axially of said aperture for releasably securing the tool arbor in the spindle socket, means providing a fixed abutment surface in said aperture inclined with respect to the spindle axis in a direction opposite to that of said socket, said abutment surface being adjacent to said locking member, said locking member having a first surface inclined in the same general direction as said fixed abutment surface for engaging the inclined surface on the arbor to be secured and a second inclined surface adapted to engage said fixed abutment surface to wedge the locking member into engagement with the arbor, means for moving said locking member axially in a rearwardly direction with respect to said spindle to cause engagement of said second surface with said abutment surface and engagement of said first surface with the inclined surface of said tool arbor and to wedge said locking member between the tool arbor and said fixed abutment surface, said second surface and said abutment surface having substantially the same angle of inclination with respect to the axis of the spindle and said first and second surfaces converging with respect to each other in the direction of movement of the locking member to wedge the latter between the abutment surface and the tool arbor.

2. In a machine tool, a spindle having an axially extending aperture therein opening into the forward end thereof, the forward portion of the spindle aperture forming a rearwardly converging tapered socket for the reception of a tool arbor having a surface inclined with respect to the axis of the arbor in a direction opposite to that of said socket and which surface is adapted to be engaged to secure the arbor in the socket, means providing a fixed abutment surface inclined with respect to the spindle axis in a direction opposite to that of said socket and extending inwardly from the side wall of the spindle aperture, a locking member positioned forwardly relative to said abutment surface having first and second surfaces converging with respect to a line diverging rearwardly from the spindle axis, said first surface being adapted to engage the inclined surface on the arbor to be secured in the spindle socket and said second surface being adapted to engage and cooperate with said abutment surface to wedge said locking member against the arbor, and means for moving said locking member rearwardly with respect to said spindle to wedge the locking member between said abutment surface and the cooperating surface on said arbor.

3. In a machine tool, a spindle having axially extending aperture therein opening into the forward end thereof, the forward portion of the spindle aperture forming a rearwardly converging tapered socket, a tool arbor positioned in said tapered socket having an adapter portion extending rearwardly therefrom and coaxially with the spindle, said adapter portion having a frusto-conical rearwardly diverging surface, means providing a fixed abutment surface adjacent to the rearward end of said frusto-conical surface, said fixed abutment surface diverging in a rearward direction from the spindle axis and extending inwardly from the sidewall of the spindle aperture, a locking member having a wedge portion positioned forwardly relative to said abutment surface, said wedge portion having first and second surfaces converging with respect to a line diverging rearwardly from the spindle axis, said first surface being adapted to engage the frusto-conical surface on said arbor and said second surface being adapted to engage and cooperate with said abutment surface to wedge said wedge portion against the adapter portion, and means for moving said locking member rearwardly with respect to said spindle to wedge the locking member between said abutment surface and said frusto-conical surface.

4. In a machine tool, a spindle having an axially extending aperture therein opening into the forward end thereof, the forward portion of the aperture forming a rearwardly converging tapered socket for the reception of a tool arbor, a collet member in said aperture for receiving a portion of the tool arbor and for releasably securing the tool arbor in said socket, said collet member including a finger having a portion with an inclined inner surface for engaging and holding the portion of an arbor received by the collet member, means for moving said collet member to a first position in said aperture for receiving the tool arbor to be secured, said collet member being movable to a second position for releasably securing the portion of the arbor received thereby, means providing an inclined abutment surface extending inwardly from the side wall of said aperture adjacent to said collet, said finger portion having an inclined outer surface for engaging and cooperating with said abutment surface to wedge said finger portion into engagement with the portion of the tool arbor received by the collet and exert a force tending to seat the tool arbor in the spindle socket, said abutment surface and said inner and outer surfaces of said finger portion being inclined in the same general direction with respect to the axis of the spindle and converging in the direction of movement of said collet member from its said first position to its said second position.

5. In a machine tool, a spindle having an axially extending aperture therein opening into the forward end thereof, the forward portion of the spindle aperture forming a rearwardly converging tapered socket for the reception of a tool arbor, means providing a fixed abutment surface in said aperture inclined rearwardly and outwardly with respect to the axis of the spindle, a collet member for receiving a portion of the arbor to be secured in the spindle socket, said collet including a plurality of fingers each having a wedge portion positioned forwardly relative to said abutment surface when said collet is positioned to receive the tool arbor, means for moving said collet rearwardly in said spindle aperture to wedge said wedge portions intermediate said abutment surface and the tool arbor, the surfaces of said wedge portions engaging the abutment surface and tool arbor, respectively, converging with respect to each other and being inclined in the same direction with respect to the spindle axis as said abutment surface.

6. In a machine tool, a spindle having an axially extending aperture therein opening into the forward end thereof, the forward portion of the spindle aperture forming a rearwardly converging tapered socket for the reception of a tool arbor having an inclined surface diverging rearwardly with respect to the axis of the arbor which surface is adapted to be engaged to secure the arbor in the socket, a movable locking member in said aperture for releasably securing the tool arbor in the spindle socket, means providing a fixed rearwardly diverging inclined abutment surface in said aperture adjacent to said locking member, said locking member having a first surface inclined in the same direction as said fixed abutment surface for engaging the inclined surface on the arbor to be secured and a second surface adapted to engage said fixed abutment surface to wedge the locking member into engagement with the arbor, spring means operatively connected between said spindle and said locking member for continuously urging said locking member in a direction with respect to the spindle tending to engage said second surface with said abutment surface and to engage said first surface with the inclined surface of the tool arbor and wedge said locking member between the tool arbor and said fixed abutment surface, said second surface and said fixed abutment surface having substantially the same angle of inclination with respect to the axis of the spindle and said first and second surfaces converging with respect to each other in the direction of movement of the locking member to wedge the latter between the abutment surface and the tool arbor, and means operatively connected to said locking member for moving it out of engagement with said abutment surface against the action of said spring means.

7. In a machine tool, a spindle having an axially extending aperture therein opening into the forward end thereof, the forward portion of the spindle aperture forming a rearwardly converging tapered socket for the reception of a tool arbor having an inclined surface diverging rearwardly with respect to the axis of the arbor which surface is adapted to be engaged to secure the arbor in the socket, means providing a fixed abutment extending inwardly from the side wall of the spindle aperture and having a surface inclined with respect to the spindle axis along a line diverging in a rearward direction from the spindle axis, a locking member positioned forwardly relative to said abutment surface having first and second inclined surfaces, said first surface being adapted to engage the inclined surface on the arbor to be secured in the spindle socket and said second surface being adapted to engage and cooperate with said abutment surface to wedge said locking member against the arbor, said first and second surfaces having different angles of inclination with respect to the spindle axis and converging with respect to one another in a rearward direction, spring means operatively connected between said spindle and said locking member for moving said locking member rearwardly relative to said spindle to wedge the locking member between said abutment surface and the inclined surface on said arbor, and power actuated means for moving said locking member forwardly with respect to said spindle against the action of said spring means.

8. In a machine tool, a spindle having an axially extending aperture therein opening into the forward end thereof, the forward portion of the aperture forming a rearwardly converging tapered socket for the reception of a tool arbor, a collet member in said aperture for receiving a portion of a tool arbor and for releasably securing the tool arbor in said socket, said collet member including a finger having a portion with an inclined inner surface diverging rearwardly with respect to the spindle axis for engaging and holding the portion of the arbor received by the collet member, means for moving said collet member in a forward direction to a first position in said aperture for receiving the tool arbor to be secured, said collet member being movable to a second position in binding engagement with the portion of the arbor received thereby, means providing an abutment surface inclined with respect to the spindle axis and extending inwardly from the side wall of said aperture adjacent to said collet member, said finger portion having an outer inclined surface for engaging and cooperating with said abutment surface when said collet member is moved to a second position to wedge said finger portion into engagement with the portion of the tool arbor received by the collet and exert a force tending to seat the tool arbor in the spindle socket, said abutment surface and said inner and outer surfaces of said finger portion being inclined in the same general direction and converging in the direction of movement of said collet member to engage said abutment surface, spring means for continuously urging said collet member to said second position, and means for moving said collet member in opposition to said spring means to release an arbor secured by the collet member.

9. In a machine tool, a spindle having an axially extending aperture therein opening into the forward end thereof, the forward portion of the spindle aperture forming a rearwardly converging tapered socket for the reception of a tool arbor, means providing a fixed abutment surface in said aperture inclined with respect to the axis of the spindle along a line diverging rearwardly from the axis of the spindle, a collet member for receiving a portion of an arbor to be secured in the spindle socket, said collet member including a finger having a wedge portion positioned forwardly relative to said abutment surface when said collet member is positioned to receive the tool arbor, spring means operatively connected between said spindle and said collet member for continuously urging said collet member rearwardly in said spindle aperture to a position with said wedge portions wedged intermediate said abutment surface and the tool arbor, said wedge portion having inclined surfaces for engaging said abutment surface and the tool arbor, respectively, the said surfaces of said wedge portion being inclined in the same general direction as said abutment surface with respect to the spindle axis and converging in a rearward direction, power actuated means operatively connected to said collet member for moving the collet member forwardly of said abutment surface against the action of said spring means to an arbor releasing position, and means for holding the collet member in an arbor receiving position forwardly of said abutment position upon the removal of an arbor from the spindle socket.

10. In a machine tool, a spindle having an axially extending aperture therein opening into the forward end thereof, the forward portion of the aperture forming a rearwardly converging tapered socket for the reception of a tool arbor, means providing a fixed inclined abutment surface diverging rearwardly from the spindle axis and extending inwardly from the side wall of the spindle aperture, a movable binding member in the spindle aperture having a wedge portion positioned forwardly relative to said abutment surface, said wedge portion having inner and outer inclined surfaces diverging rearwardly from the spindle axis, means for moving said binding member rearwardly to wedge said wedge portion intermediate said abutment surface and a rearwardly inclined surface on the arbor to be secured, said outer surface of the wedge portion engaging said fixed abutment surface and said inner surface of the wedge portions engaging the inclined surface on the arbor to be secured, the angle of inclination of said abutment surface being less than the angle of inclination of said inner surface, means for moving said binding member forwardly from its binding position to a position with sad wedge portions located forwardly of said fixed abutment surface to release the arbor, said binding member including an ejector portion adapted to engage the arbor and move it from its seated position in the socket upon movement of the binding member to its forward position, means for preventing movement of said binding member in a rearward direction and for holding said binding member in an arbor receiving position when said binding member is moved a predetermined distance rearwardly from the limit of its arbor ejecting movement, said predetermined distance being such as to withdraw said ejector portion sufficiently to permit an arbor to be seated in said socket and maintain said wedge portions forwardly of said abutment surface.

11. In a machine tool, a spindle having an axially extending aperture therein opening into the forward end thereof, the forward portion of the aperture forming a rearwardly converging tapered socket for the reception of a tool arbor, means providing a fixed abutment surface extending inwardly and forwardly of the spindle from the side wall of the spindle aperture and terminating in a shoulder extending inwardly from the side wall of the aperture at the forward end of the fixed abutment surface, a collet in the spindle aperture adapted to receive a portion of an arbor to be secured and having a plurality of collet fingers, each collet finger having a wedge portion with inner and outer inclined surfaces thereon, said surfaces of said wedge portions diverging rearwardly from the spindle axis and positioned forwardly relative to said abutment surface when the collet is in position to receive an arbor, means for moving said collet rearwardly to wedge said wedge portions intermediate said abutment surface and the arbor to be secured, said outer surface engaging said fixed abutment surface and said inner surface engaging a cooperating inclined surface on the arbor to be secured, the angle of inclination of said abutment surface being less than the angle of inclination of said inner surface, means for moving said collet forwardly from its binding position to a position with said wedge portions located forwardly of said fixed abutment surface to release the arbor, said collet including an ejector portion for engaging the arbor and moving it from its seated position in the socket upon movement of the collet to its forward position, latch means operatively connected to said collet for preventing movement of said collet in a rearward direction and for holding the latter in an arbor receiving position, said latch means engaging to prevent the rearward movement of the collet upon a predetermined movement of the latter from the limit of its arbor ejecting movement, said predetermined movement withdrawing said ejector portion sufficiently to permit an arbor to be seated in said socket but maintaining said wedge portions forwardly of said abutment surface.

12. In a machine tool, a spindle having an axially extending aperture therein opening into the forward end thereof, the forward portion of the spindle aperture forming a rearwardly converging tapered socket for the reception of a tool arbor having a surface diverging rearwardly from the axis of the arbor adjacent the rearward end thereof, means providing a fixed abutment surface diverging in a rearward direction from the spindle axis and extending inwardly from the side wall of the spindle aperture, a locking member axially movable in said spindle aperture and having a first position and a second position rearwardly of the first position, said locking member having first and second surfaces positioned forwardly relative to said abutment surface when in said first position with the surfaces being inclined along a line diverging rearwardly from the spindle axis, said first surface being adapted to engage the inclined surface on the arbor to be secured and said second surface being adapted to engage and cooperate with said abutment surface to wedge said locking member against the arbor upon the movement of said locking member from its first said position to said second position, means for continuously urging said locking member rearwardly with respect to said spindle, and cam means for moving said locking member to said first position against the action of said spring means.

13. In a machine tool, a spindle having an axially extending aperture therein opening into the forward end thereof, the forward portion of the spindle aperture forming a rearwardly converging tapered socket for the reception of a tool arbor having a surface diverging rearwardly from the axis of the arbor adjacent the rearward end thereof, means providing a fixed abutment surface diverging in a rearward direction from the spindle axis and extending inwardly from the side wall of the spindle aperture, a locking member axially movable in said spindle aperture and having a first position and a second position rearwardly of said first position, said locking member having first and second surfaces positioned forwardly relative to said abutment surface when in said first position with the surfaces converging with respect to each other and a line diverging rearwardly from the spindle axis, said first surface being adapted to engage the inclined surface on the arbor to be secured and said second surface being adapted to engage and cooperate with said abutment surface to wedge said locking member against the arbor upon the movement of said locking member from its first said position to said second position, means for continuously urging said locking member rearwardly with respect to said spindle, and cam means for moving said locking member to said first position against the action of said spring means, said cam means including a cam having a flat portion for maintaining said locking member in said first position.

References Cited in the file of this patent
UNITED STATES PATENTS

| | | |
|---|---|---|
| 1,807,265 | Walker | May 26, 1931 |
| 1,961,129 | De Haas et al. | June 5, 1934 |
| 2,485,799 | Woytych | Oct. 25, 1949 |
| 2,713,811 | Stephan | July 26, 1955 |